United States Patent
Kim et al.

(10) Patent No.: US 10,710,522 B2
(45) Date of Patent: Jul. 14, 2020

(54) DIAGNOSTIC METHODS AND APPARATUSES IN VEHICLE NETWORK

(71) Applicants: HYUNDAI MOTOR COMPANY, Seoul (KR); KIA MOTORS CORPORATION, Seoul (KR)

(72) Inventors: Dong Ok Kim, Goyang-si (KR); Kang Woon Seo, Seoul (KR); Jin Hwa Yun, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 228 days.

(21) Appl. No.: 15/702,317

(22) Filed: Sep. 12, 2017

(65) Prior Publication Data

US 2018/0072250 A1    Mar. 15, 2018

(30) Foreign Application Priority Data

Sep. 12, 2016   (KR) .................. 10-2016-0117614
Aug. 17, 2017   (KR) .................. 10-2017-0104005

(51) Int. Cl.
| | |
|---|---|
| *H04L 29/08* | (2006.01) |
| *B60R 16/023* | (2006.01) |
| *H04L 12/40* | (2006.01) |
| *H04L 12/46* | (2006.01) |
| *H04W 24/04* | (2009.01) |
| *H04L 29/06* | (2006.01) |
| *H04W 12/06* | (2009.01) |
| *H04W 76/10* | (2018.01) |
| *G07C 5/00* | (2006.01) |

(Continued)

(52) U.S. Cl.
CPC .......... *B60R 16/0234* (2013.01); *G07C 5/008* (2013.01); *G07C 5/085* (2013.01); *H04L 12/40006* (2013.01); *H04L 12/4625* (2013.01); *H04L 63/08* (2013.01); *H04L 63/10* (2013.01); *H04W 12/06* (2013.01); *H04W 12/08* (2013.01); *H04W 24/04* (2013.01); *H04W 76/10* (2018.02); *H04L 67/12* (2013.01)

(58) Field of Classification Search
CPC . H04L 9/00; H04L 63/08; H04L 63/10; H04L 67/12; H04W 12/06; H04W 12/08
See application file for complete search history.

(56) References Cited

U.S. PATENT DOCUMENTS

| | | | | |
|---|---|---|---|---|
| 2004/0073791 | A1* | 4/2004 | Vollmer | H04L 12/40078 713/168 |
| 2015/0351137 | A1* | 12/2015 | Neff | G07C 5/0808 370/329 |

* cited by examiner

*Primary Examiner* — Ellen Tran
(74) *Attorney, Agent, or Firm* — Morgan, Lewis & Bockius LLP

(57) ABSTRACT

A diagnostic method performed by a gateway in a vehicle network, wherein the gateway comprises a controller and a physical (PHY) layer which manages ports and is connected to the controller, may comprise receiving, by the controller, a diagnostic request message from an external diagnostic apparatus connected to a first port; receiving, by the controller, a security authentication request message from the external diagnostic apparatus when a security authentication is required for the diagnostic request message; verifying, by the controller, the security authentication request message; and activating, by the PHY layer, a port of the PHY layer connected to a target communication node to be diagnosed among the ports, under control of the controller, when verification of the security authentication request message is completed.

10 Claims, 9 Drawing Sheets

(51) Int. Cl.
*G07C 5/08* (2006.01)
*H04W 12/08* (2009.01)

DIAGNOSTIC METHODS AND APPARATUSES IN VEHICLE NETWORK

CROSS-REFERENCE TO RELATED APPLICATIONS

This application claims the benefit of and priorities to Korean Patent Applications No. 10-2016-0117614 filed on Sep. 12, 2016 and No. 10-2017-0104005 filed on Aug. 17, 2017 in the Korean Intellectual Property Office (KIPO), the entirety of which is incorporated by reference as if fully set forth herein.

TECHNICAL FIELD

The present disclosure relates to a vehicle network technology, and more specifically, to a diagnostic method and a diagnostic apparatus for an Ethernet-based vehicle network.

BACKGROUND

Electronic devices installed in a vehicle have been increased significantly in their number and variety along with recent digitalization of vehicle parts. Generally, electronic devices may be used throughout the vehicle, such as in a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

Meanwhile, the telematics system and the infotainment system, like most enhanced safety systems of a vehicle do, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of wirings and may support a transmission rate of up to 10 Gbps.

As the application of the Ethernet-based vehicle network is expanded, there is a need for a diagnosis method different from a conventional bus method. In the Ethernet-based vehicle network, a PHY layer may perform switching of connection states of communication ports, and thus a corresponding diagnostic method is required. Also, there is a need for a technology capable of maintaining security of a vehicle in the diagnostic method using Ethernet.

SUMMARY

In order to resolve the above-described problems, the present disclosure provides a diagnostic method and a diagnostic apparatus for an Ethernet-based vehicle network. The diagnostic apparatus may comprise a gateway in the Ethernet-based vehicle network.

In order to achieve the above-described objective, an aspect of the present disclosure provides a diagnostic method performed by a gateway in a vehicle network. The gateway may comprise a controller and a physical (PHY) layer which manages ports and is connected to the controller. The method may comprise receiving, by the controller, a diagnostic request message from an external diagnostic apparatus connected to a first port; receiving, by the controller, a security authentication request message from the external diagnostic apparatus when a security authentication is required for the diagnostic request message; verifying, by the controller, the security authentication request message; and activating, by the PHY layer, a port of the PHY layer connected to a target communication node to be diagnosed among the ports, under control of the controller, when verification of the security authentication request message is completed.

The PHY layer may transfer the diagnostic request message to the target communication node without transferring the diagnostic request message to the controller, when a security authentication is not required for the diagnostic request message.

The controller may terminate a diagnostic procedure and do not allow communications between the external diagnostic apparatus and an in-vehicle communication node when the verification of the security authentication request message fails.

The method may further comprise determining, by the controller, at least one of a medium access control (MAC) address and an Internet protocol (IP) address of the target communication node based on a name or information on a function of the target communication node to be diagnosed, wherein the diagnostic request message includes the name or information on the function of the target communication node.

The method may further comprise transmitting, by the controller, security authentication information for the external diagnostic apparatus to the target communication node when the verification of the security authentication request message is completed.

The security authentication request message may be received together with information on a service time during which a diagnosis of the external diagnostic apparatus is performed.

The method may further comprise deactivating, by the PHY layer, the port connected to the target communication node under control of the controller when the service time expires.

The PHY layer may transfer a message, which is not a message for monitoring on the target communication node, to the controller when the service time expires.

The method may further comprise receiving, by the PHY layer, a diagnostic response message from the target communication node; and transferring, by the PHY layer, the diagnostic response message to the external diagnostic apparatus in a port forwarding manner under control of the controller.

The vehicle network may comprise an Ethernet-based vehicle network and a controller area network (CAN) based vehicle network, and the target communication node may belong to the Ethernet-based vehicle network.

In order to achieve the above-described objective, another aspect of the present disclosure provides a diagnostic method performed by a gateway in a vehicle network. The gateway may comprise a controller and a physical (PHY) layer which manages ports and is connected to the controller. The method may comprise receiving, by the PHY layer, a vehicle network use request message from an external diagnostic apparatus connected to a first port; determining, by the controller, whether the vehicle is in a stopped state; configuring, by the controller, a port mirroring of the PHY layer such that a message received from the external diagnostic apparatus is mirrored to a target communication node when the vehicle is in a stopped state; receiving, by the PHY layer, a first diagnostic request message from the external diagnostic apparatus; and transferring, by the PHY layer, the first diagnostic request message to the target communication node by the port mirroring.

The first diagnostic request message may be received together with information on a service time during which a diagnosis of the external diagnostic apparatus is performed.

The method may further comprise deactivating, by the PHY layer, a port connected to the target communication node when the service time expires.

The method may further comprise receiving, by the PHY layer, a diagnostic response message from the target communication node; and transferring, by the PHY layer, the diagnostic response message to the external diagnostic apparatus.

The method may further comprise receiving, by the PHY layer, a second diagnostic request message including a unicast address indicating the target communication node from the external diagnostic apparatus when the vehicle is not in a stopped state, determining, by the controller, a first port identifier (ID) of a first port to which the second diagnostic request message is transferred based on the unicast address indicating the target communication node; and forwarding, by the PHY layer, the second diagnostic request message through the first port corresponding to the first port ID under control of the controller.

The method may further comprise receiving, by the PHY layer, a diagnostic response message including a unicast address indicating the external diagnostic apparatus from the target communication node; determining, by the controller, a second port ID of a second port to which the diagnostic response message is transferred based on the unicast address indicating the external diagnostic apparatus; and forwarding, by the PHY layer, the diagnostic response message through the second port corresponding to the second port ID under control of the controller.

In order to achieve the above-described objective, yet another aspect of the present disclosure provides a gateway in a vehicle network. The gateway may comprise a controller and a physical (PHY) layer which is connected to the controller and manages connection states of ports, wherein the controller may receive an authentication request message from an external diagnostic apparatus connected to a first port; receive a security authentication request message from the external diagnostic apparatus when a security authentication on the authentication request message is required; and verify the security authentication request message, and the PHY layer may activate a port connected to a target communication node to be diagnosed among the ports under a control of the controller, when verification of the security authentication request message is completed.

The PHY layer may transfer the diagnostic request message to the target communication node without transferring the diagnostic request message to the controller, when a security authentication is not required for the diagnostic request message.

The diagnostic request message may include a name or information on a function of the target communication node to be diagnosed, and the controller determines at least one of a medium access control (MAC) address and an Internet protocol (IP) address of the target communication node based on the name or information on the function of the target communication node.

The controller may receive information on a service time during which a diagnosis of the external diagnostic apparatus is performed, and the PHY layer may deactivate the port connected to the target communication node under control of the controller when the service time expires.

According to the embodiments of the present disclosure, while the external diagnostic apparatus performs a diagnosis for the vehicle network, the gateway can manage the connection states of the communication ports, so that message exchanges can be made between the external diagnostic apparatus and the target communication node. Through the port mirroring, the forwarding method, etc., the messages can be selectively transmitted to the target communication node or the external diagnostic apparatus during the diagnosis process. Also, considering security range and service time, the gateway can enhance security in the diagnostic procedure by activating or deactivating the connection states of the communication ports.

BRIEF DESCRIPTION OF DRAWINGS

Embodiments of the present disclosure will become more apparent by describing in detail forms of the present disclosure with reference to the accompanying drawings, in which.

Figure 1:
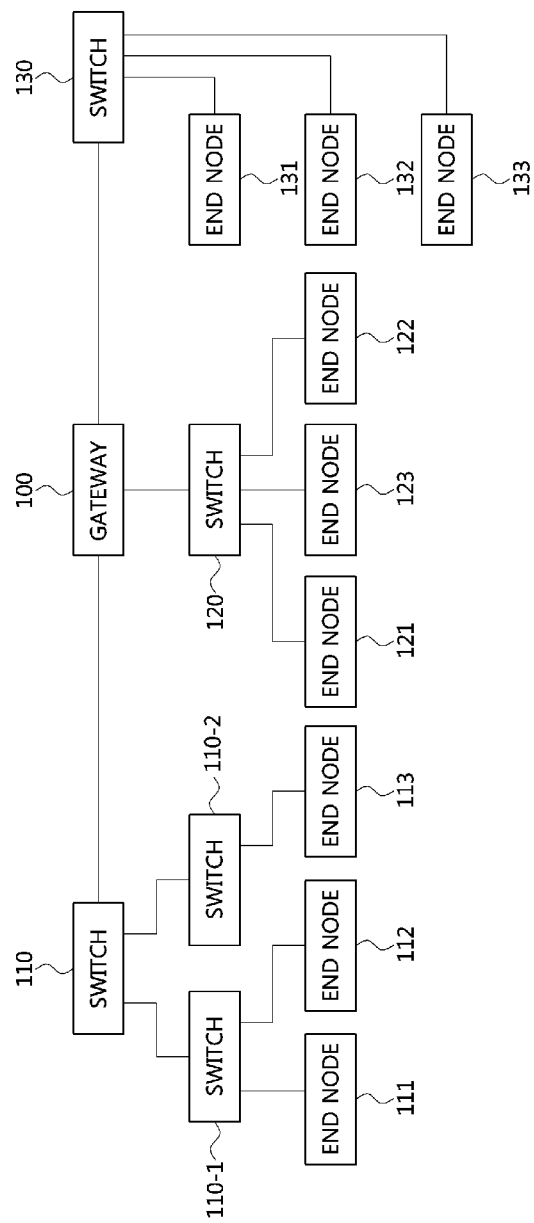
FIG. 1 shows a block diagram illustrating a first embodiment of a vehicle network topology.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

In a case that the devices constituting the Ethernet-based network change dynamically as time elapses, an address table in an Ethernet switch may be updated through a medium access control (MAC) learning which is a basic function of the Ethernet switch. On the other hand, in a restricted network environment, such as an in-vehicle network, where locations or addresses of devices constituting the network are defined in a static manner, an unnecessary MAC learning process may be omitted by predefining the address table in the Ethernet switch. This makes it possible to improve the efficiency of network communication processing and the efficiency of network management. The present disclosure proposes embodiments of a system and a method for diagnosing a communication error in an internal or external device in the Ethernet-based vehicle network and detecting an unregistered (unauthenticated) external device based on information that the Ethernet switches have when performing communications between external devices and the vehicle to which the Ethernet network is applied by utilizing such the characteristics of the in-vehicle network and functions of the Ethernet switches constituting the in-vehicle network.

FIG. 1 is a block diagram illustrating a first embodiment of a vehicle network topology.

Referring to FIG. 1, a communication node constituting a vehicle network may be a gateway, a switch (or bridge), or an end node. The gateway 100 may be connected with switches 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN)) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of the end nodes 111, 112, 113, 121, 122, 123, 131, 132, and 133 connected to each of the switches.

Each of the end nodes 111, 112, 113, 121, 122, 123, 131, 132, and 133 may include an electronic control unit (ECU) configured to control various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring (AVM) device).

Meanwhile, the communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. Embodiments of the present disclosure may be applied to the vehicle network connected in one of the above-described topologies, but a network topology applied to embodiments of the present disclosure may be configured variously without being limited thereto.

Figure 2:
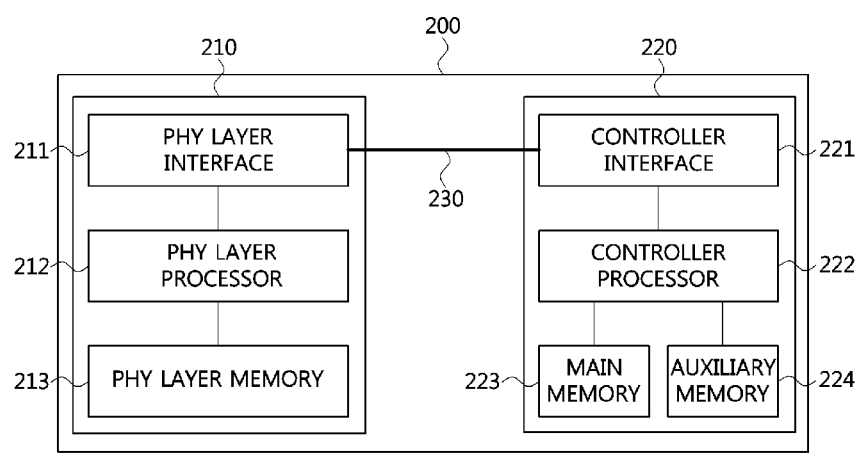
FIG. 2 shows a block diagram illustrating a first embodiment of a communication node belonging to a vehicle network.

FIG. 2 shows a block diagram illustrating a first embodiment of a communication node belonging to a vehicle network.

Referring to FIG. 2, a communication node 200 constituting a vehicle network (e.g., the vehicle network illustrated in FIG. 1) may include a physical (PHY) layer 210 and a controller 220. Also, the communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer 210 and perform various functions (e.g., an infotainment function, or the like). The PHY layer 210 and the controller 220 may be implemented as one system on chip (SoC), or alternatively may be implemented as separate chips.

The PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and an auxiliary memory 224. The controller processor 222 is an electric circuitry which performs various functions described below. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Meanwhile, the PHY layer 210 (i.e., the PHY layer processor 212) may operate in a sleep mode, a normal mode (e.g., an active mode), and the like. The PHY layer 210 may transition from the sleep mode to the normal mode and transition from the normal mode to the sleep mode based on a control of the controller processor 222. The controller 220 (e.g., the controller processor 222) may operate in a power-off mode, a sleep mode, a normal mode, and the like. The controller 220 may transition from the power-off mode to the sleep mode or the normal mode, may transition from the sleep mode to the power-off mode or the normal mode, and may transition from the normal mode to the power-off mode or to the sleep mode.

Here, the power-off mode may mean a state in which power is not supplied to a corresponding entity (e.g., the controller 220). The sleep mode may mean a state in which a minimum power is supplied to a corresponding entity (e.g., the PHY layer 210, the controller 220, etc.) for basic operations (i.e., a power saving state). The normal mode may refer to a state in which power is normally supplied to a corresponding entity (e.g., the PHY layer 210, the controller 220, etc.) (e.g., a wake-up state).

Figure 3:
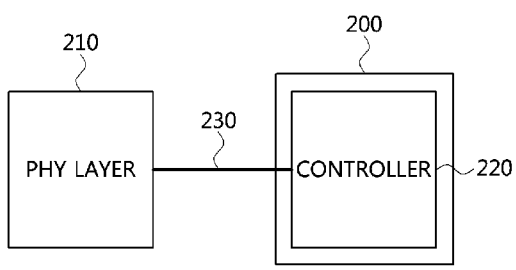
FIG. 3 shows a block diagram illustrating a second embodiment of a communication node belonging to a vehicle network.

FIG. 3 is a block diagram illustrating a second embodiment of a communication node belonging to a vehicle network.

Referring to FIG. 3, the communication node 200 may include the controller 220 and may further include a regulator (not shown) for supplying a power. The controller 220 may be connected to the PHY layer 210 located outside the communication node 200 and may control the PHY layer 210. The functions of the PHY layer 210 and the controller 220 shown in FIG. 3 may be the same or similar to those of the PHY layer 210 and the controller 220 shown in FIG. 2.

The PHY layer 210 may be coupled to the controller 220 via a media independent interface 230. The MII 230 may refer to an interface defined in IEEE 802.3, and may be configured as a data interface and a management interface between the PHY layer 210 and the controller 220. One of RMII, GMII, RGMII, SGMII, and XGMII may be used instead of the MII 230. The data interface may include a transmission channel and a reception channel, each of which may have independent clock, data, and signal. The management interface may be configured as a two-signal interface, one for the clock and one for the data.

Meanwhile, a protocol structure of the communication node shown in FIG. 1 to FIG. 3 may be as follows.

Figure 4:
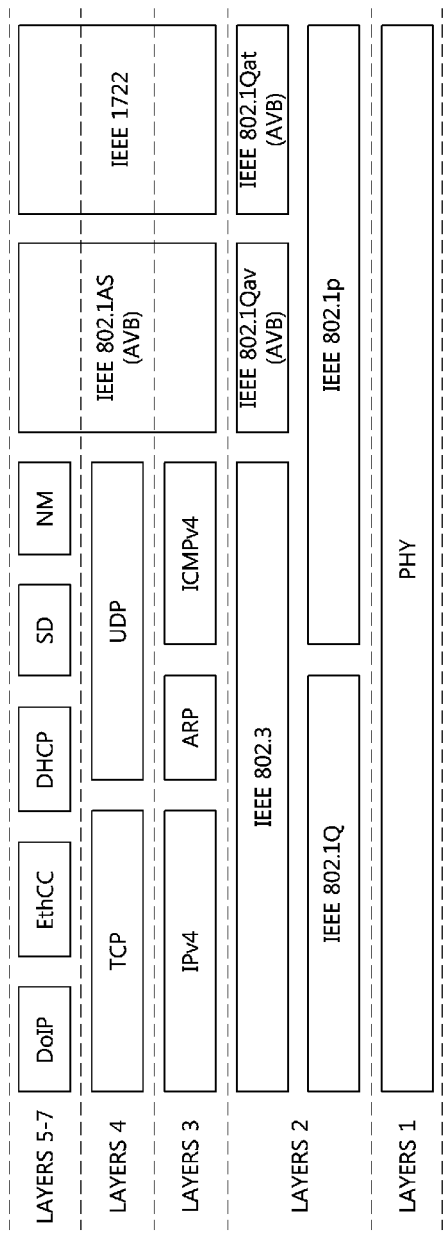
FIG. 4 shows a block diagram illustrating an embodiment of a protocol structure of a communication node constituting a vehicle network.

FIG. 4 is a block diagram illustrating an embodiment of a protocol structure of a communication node constituting a vehicle network.

Referring to FIG. 4, a communication node may comprise layer 1 through layer 7. The layer 1 of the communication node may support the PHY functions and support a transmission rate of 100 megabits per second (Mbps). The layer 2 of the communication node may support IEEE 802.1Q protocol, IEEE 802.1p protocol, IEEE 802.3 protocol, audio video bridging (AVB) protocol (e.g., IEEE 802.1Qav protocol, IEEE 802.1Qat protocol), and the like. The layer 3 of the communication node may support internet protocol version 4 (IPv4), address resolution protocol (ARP), internet control message protocol version 4 (ICMPv4), IEEE 802.1AS, IEEE 1722, and the like. The layer 4 of the communication node may support transfer control protocol (TCP), user datagram protocol (UDP), IEEE 802.1AS, IEEE 1722, and the like. The layers 5 through 7 of the communication node may support diagnostics over internet protocol (DoIP), EthCC protocol, dynamic host configuration protocol (DHCP), SD protocol, network management (NM) protocol, IEEE 802.1AS, IEEE 1722, and the like.

The communication node described above may operate in a sleep mode or a normal mode. In the sleep mode, the PHY layer of the communication node may be an enabled state, and the controller of the communication node may be a disabled state. Alternatively, in the sleep mode, the PHY layer and the controller of the communication node may be in the disabled state. In the normal mode, the PHY layer and the controller of the communication node may be enabled. That is, the normal mode may indicate a state in which the communication node has waked up. When a wakeup signal is received or when a specific event is detected, the operating mode of the communication node may transition from the sleep mode to the normal mode. In this case, a system booting procedure of the communication node may be performed.

Figure 5:
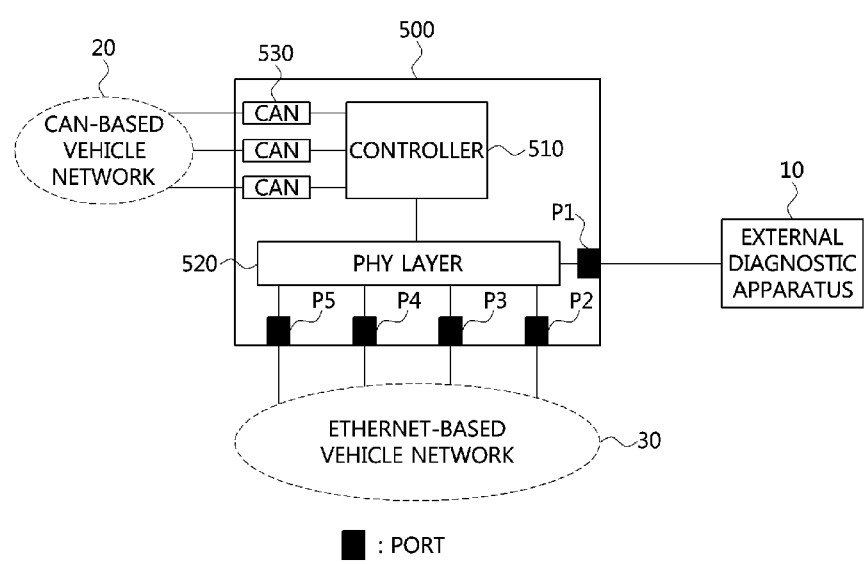
FIG. 5 shows a conceptual diagram illustrating a gateway included in a vehicle network.

FIG. 5 is a conceptual diagram illustrating a gateway included in a vehicle network.

Referring to FIG. 5, a gateway 500 may include a controller 510 and a PHY layer 520. The controller 510 may be comprised of a logic circuit comprising at least one processing core.

The gateway 500 may be connected to a CAN-based vehicle network 20. The gateway 500 may include a plurality of CAN communication channels 530. The plurality of CAN communication channels 530 may be connected to the controller 510. The gateway 500 may exchange signals with a communication node belonging to the CAN-based vehicle network 20 via the plurality of CAN communication channels 530.

The gateway 500 may include a plurality of communication ports P1, P2, P3, P4, and P5. The first port P1 may be connected to an external diagnostic apparatus 10. The second to fifth ports P2, P3, P4 and P5 may be connected to communication nodes belonging to an Ethernet-based vehicle network 30. The gateway 500 may receive a message transmitted by the external diagnostic apparatus 10 through the first port P1. The PHY layer 520 may manage connection states of the ports P1, P2, P3, P4, and P5. The PHY layer 520 may enable or disable connections of the ports P1, P2, P3, P4, and P5. A signal may not be transmitted through a disabled port.

The gateway 500 may relay the communications between the external diagnostic apparatus 10 and a communication node belonging to the vehicle network. The external diagnostic apparatus 10 may perform a diagnostic procedure for the communication node belonging to the vehicle network through the gateway 500. The diagnostic procedure may be classified into four sessions. For example, the diagnostic procedure may be performed according to any one of a default session, an extended session, a security session, and a dedicated session. Some of the diagnostic procedures in the default session may not require security verification. In the default session, an allowable range of information exchange may be determined by laws and regulations.

When the external diagnostic apparatus 10 intends to diagnose an electrical component in the vehicle, the external diagnostic apparatus 10 may transmit a diagnostic request message to the gateway 500. The PHY layer 520 may receive the diagnostic request message via the first port P1. The delivery process of the diagnostic request message may vary depending on a diagnostic range of a diagnosis required by the diagnostic request message.

Figure 6:
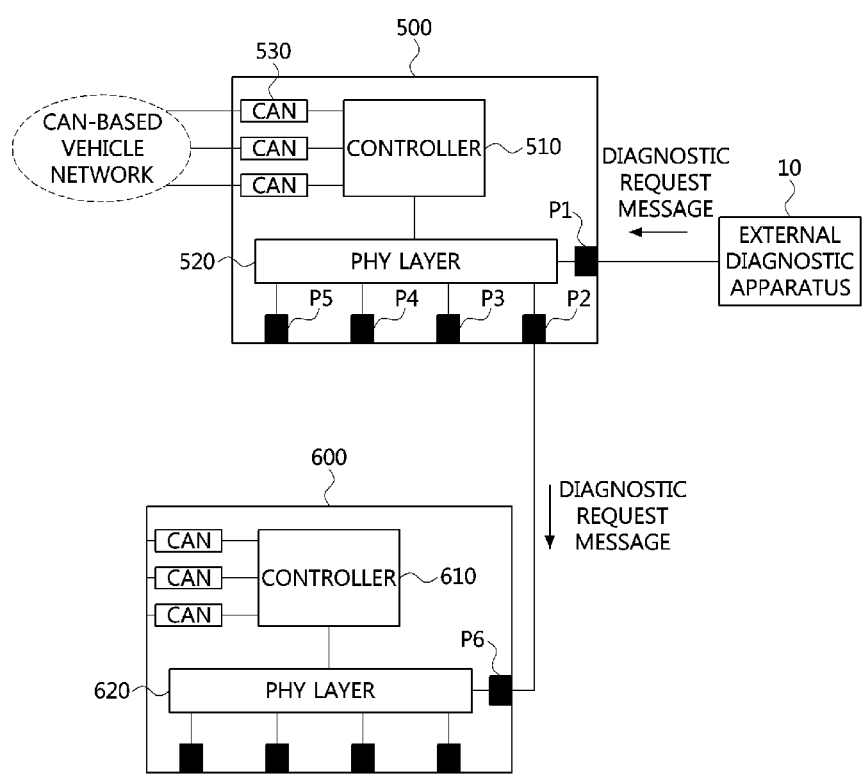
FIG. 6 shows a conceptual diagram illustrating a first embodiment of a procedure in which a diagnostic request message is transferred from an external diagnostic apparatus to a target communication node.

FIG. 6 is a conceptual diagram illustrating a first embodiment of a procedure in which a diagnostic request message is transferred from an external diagnostic apparatus to a target communication node.

Referring to FIG. 6, if a security verification is not required for the diagnostic request message, the diagnostic request message may be directly transmitted to a target communication node 600 without going through the controller 510 of the gateway 500. For example, if the external diagnostic apparatus 10 transmits a diagnostic request message requesting a diagnosis within a range not requiring security, the diagnostic request message may not be transmitted to the controller 510. The PHY layer 520 may determine whether or not security is required for the diagnostic request message based on information included in a preamble of the diagnostic request message.

The target communication node 600 may be a communication node to be diagnosed. The target communication node 600 may belong to the Ethernet-based vehicle network 30. The target communication node 600 may be an automotive electronic control unit (ECU) or an end node of the vehicle network. The target communication node 600 may also include a controller 610 and a PHY layer 620. However, the target communication node 600 may not include the controller 610 in some cases. The target communication node 600 may communicate with the gateway 500 via a sixth port P6 of it. The PHY layer 620 of the target communication node 600 may manage connection states of ports included in the target communication node 600. For example, when the PHY layer 620 deactivates the sixth port P6, communications between the gateway 500 and the target communication node 600 may be disabled.

If security is not required in the diagnostic request message, the PHY layer 520 may not forward the diagnostic request message to the controller 510. The PHY layer 520 may communicate the diagnostic request message to the target communication node 600 via a second port P2 connected to the target communication node 600. When there are a plurality of target communication nodes to be diagnosed, the PHY layer 620 may transmit the diagnostic request message through a plurality of ports. As another example, the PHY layer 620 may deliver the diagnostic request message through all the ports P2, P3, P4, and P5 as well as the second port P2 to which the target communication node 600 is connected.

The embodiment described with reference to FIG. 6 may be applied when the diagnosis of the vehicle progresses according to the basic session. However, the embodiment of the present disclosure is not limited thereto. For example, the embodiment shown in FIG. 6 may also be applied to the extended session, the security session, and the dedicated session.

Figure 7:
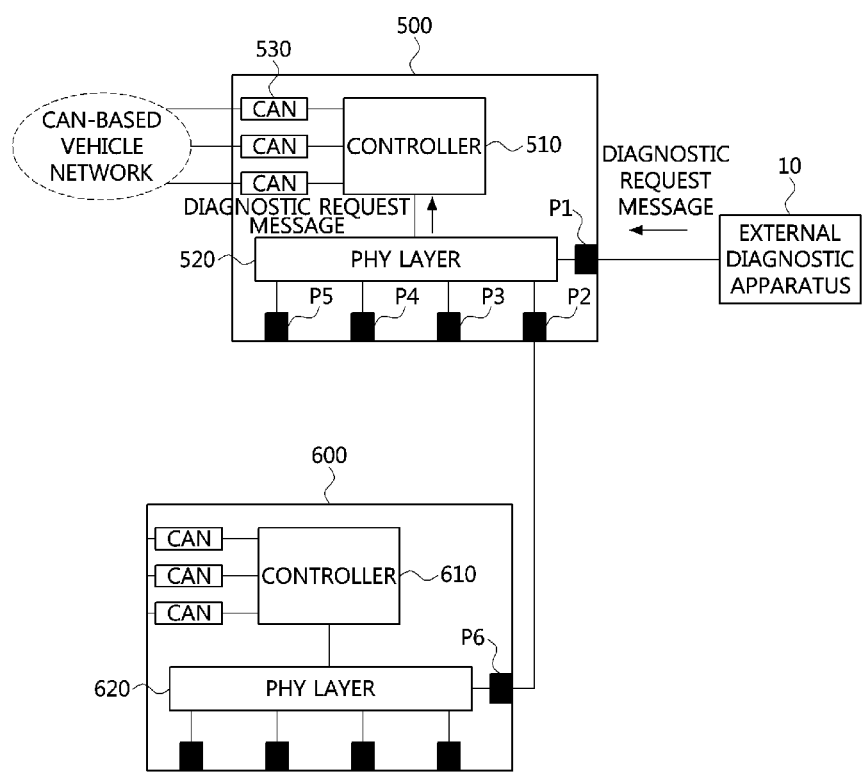
FIG. 7 shows a conceptual diagram illustrating a second embodiment of a procedure in which a diagnostic request message is transferred from an external diagnostic apparatus to a target communication node.

FIG. 7 is a conceptual diagram illustrating a second embodiment of a procedure in which a diagnostic request message is transferred from an external diagnostic apparatus to a target communication node.

Referring to FIG. 7, when a security verification is required for the diagnostic request message, the PHY layer 520 may transmit the diagnostic request message to the controller 510. The controller 510 may proceed with a security verification procedure. The controller 510 may receive a security authentication request message from the external diagnostic apparatus 10 and verify the security authentication request message.

Figure 8:
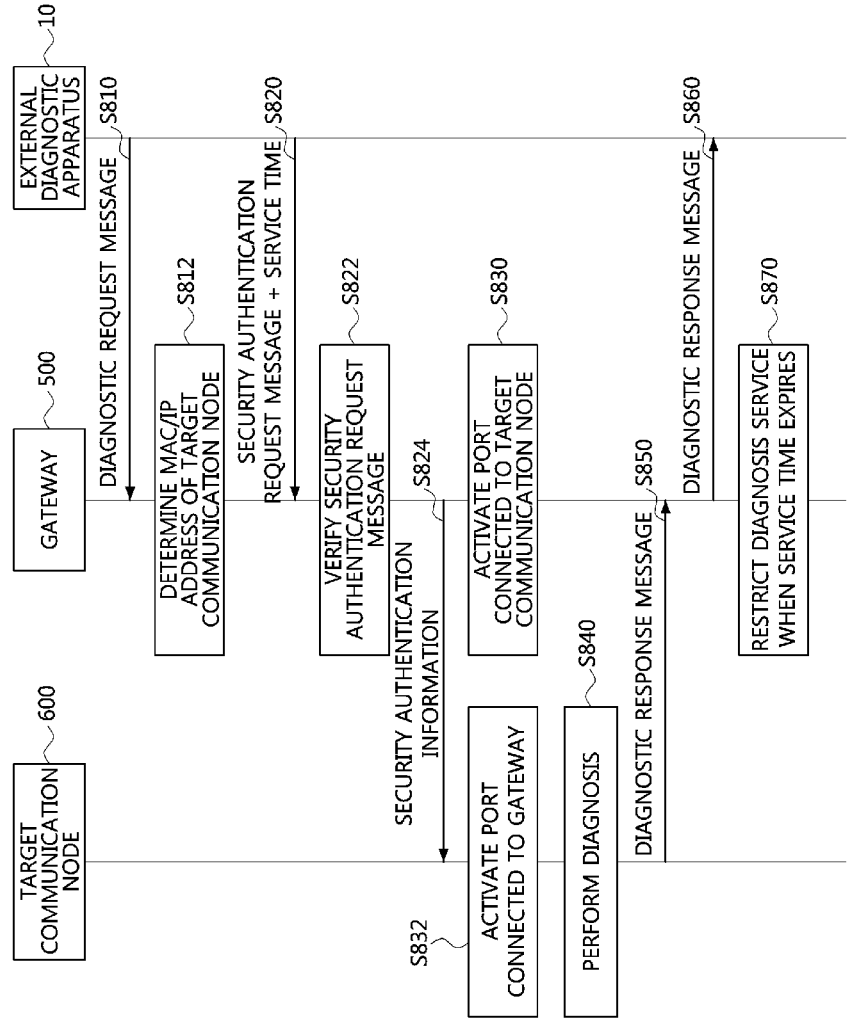
FIG. 8 shows a sequence chart illustrating a first embodiment of a vehicle diagnostic method.

FIG. 8 is a sequence chart illustrating a first embodiment of a vehicle diagnostic method.

The vehicle diagnostic method shown in FIG. 8 may be applied to the basic session. However, the embodiment is not limited thereto. For example, the vehicle diagnostic method shown in FIG. 8 may also be applied to the extended session, the security session, and the dedicated session.

Referring to FIG. 8, in a step S810, the external diagnostic apparatus 10 may transmit a diagnostic request message through the first port P1. The PHY layer 520 may receive the diagnostic request message. If a security verification is required for the diagnostic request message, the PHY layer 520 may not forward the diagnostic request message to the target communication node 600 immediately. The PHY layer 520 may forward the diagnostic request message to the controller 510.

In a step S812, the controller 510 may determine an Ethernet MAC address or an IP address of the target communication node to be diagnosed from the diagnosis request message. The external diagnostic apparatus 10 may make a name of the target communication node 600 or information about a function performed by the target communication node 600 be included in the diagnostic request message. The controller 510 may know in advance the MAC address or the IP address of the communication node that matches the name or function. That is, the controller 510 may determine the Ethernet MAC address or the IP address of the target communication node 600 using previously stored information from the name or function of the target communication node 600 included in the diagnostic request message.

In a step S820, the external diagnostic apparatus 10 may transmit a security authentication request message. The external diagnostic apparatus 10 may transmit the security authentication request message and service time information together. The service time information may be information on a service time during which a diagnostic service is performed. The controller 510 may receive the security authentication request message and the service time information through the PHY layer 520.

In a step S822, the controller 510 may perform verification of the security authentication request message. The controller 510 may verify the security authentication request message to determine whether the diagnosis to be performed by the external diagnostic apparatus 10 is within an allowed security range. If the verification of the security authentication request message fails, the controller 510 may terminate the diagnostic procedure and may not allow communications between the external diagnostic apparatus 10 and the in-vehicle communication node.

In a step S824, when the verification of the security authentication request message is completed, the PHY layer 520 may transmit security authentication information for the external diagnostic apparatus 10 to the target communication node 600. The controller 510 may determine which port is connected to the target communication node 600 based on the Ethernet MAC address or the IP address of the target communication node 600 determined in the step S812. The controller 510 may inform the PHY layer 520 of information on the port connected to the target communication node 600. The PHY layer 520 may transmit the security authentication information to the target communication node 600 via the second port P2.

In a step S830, when the verification of the security authentication request message is completed, the controller 510 may transmit a control command to the PHY layer 520. The PHY layer 520 may activate the second port P2 connected to the target communication node 600 under control of the controller 510.

In a step S832, the target communication node 600 may receive the security authentication information from the gateway 500. The controller 610 of the target communication node 600 may transmit a control command to the PHY layer 620. The PHY layer 620 may activate the sixth port P6 connected to the gateway 500 under control of the controller 610. Communications between the external diagnostic apparatus 10 and the target communication node 600 may be allowed by activating the second port P2 and the sixth port P6.

In a step S840, the target communication node 600 may perform a diagnostic function. The target communication node 600 may extract diagnostic information on a diagnosis requested by the external diagnostic apparatus 10. The target communication node 600 may generate a diagnostic response message based on the diagnostic information.

In step a S850, the target communication node 600 may transmit the diagnostic response message. The gateway 500 may receive the diagnostic response message via the second port P2. The controller 510 may configure the PHY layer 510 such that the diagnostic response message received via the second port P2 is forwarded through the first port P1. When the port forwarding is configured, the diagnostic response message may be transmitted to the external diagnostic apparatus 10 without going through the controller 510.

In a step S860, the PHY layer 520 may transmit the diagnostic response message to the external diagnostic apparatus 10 in a port forwarding manner under control of the controller 510. The PHY layer 520 may forward the diagnostic response message through the first port P1 to which the external diagnostic apparatus 10 is connected.

In a step S870, when the service time expires, the controller 510 may restrict the diagnostic service by changing the configuration of the PHY layer 520. For example, the controller 510 may change the configuration of the PHY layer 520 such that the second port P2 to which the target communication node 600 is connected is deactivated. The PHY layer 520 may deactivate the second port P2 or the second to fifth ports P2, P3, P4, and P5 under the control of the controller 510. As another example, the controller 510 may change the configuration of the PHY layer 520 such that the first port P1 to which the external diagnostic apparatus 10 is connected is deactivated. The PHY layer 520 may deactivate the first port P1 under the control of the controller 510. As yet another example, the controller 510 may change the configuration of the PHY layer 520 such that all ports of the gateway 500 are deactivated. The PHY layer 520 may deactivate the first to fifth ports P1, P2, P3, P4, and P5 under the control of the controller 510. By the operation of the controller 510 and the PHY layer 520 described above, when the service time is ended, the port forwarding configuration may be released. Message exchanges between the external diagnostic apparatus 10 and the target communication node 600 may be restricted.

In the above description, the PHY layer 520 deactivates at least one of the ports to limit the diagnostic service. However, the embodiments are not limited thereto. For example, the PHY layer 520 may block diagnostic services while keeping the ports as active state. In this case, under a control of the controller 510, the PHY layer 520 may not transmit a message received from the external diagnostic apparatus 10 to other ports. In addition, the PHY layer 520 may not transmit the message received from the target communication node 600 to the external diagnostic apparatus 10.

Alternatively, in the step S870, when the service time expires, the controller 510 may partially restrict the diagnostic service. For example, the controller 510 may configure the PHY layer 520 such that a message which is not for monitoring on the target communication node 600 is forwarded to the controller 510. The PHY layer 520 may forward the message to the controller 510 without forwarding the message which is not for the monitoring by the port forwarding method. The controller 510 may determine whether the message is delivered. The controller 510 may not allow the PHY layer 520 to forward the message if it determines that message delivery is inappropriate. In this case, communications between the external diagnostic apparatus 10 and the target communication node 600 may be partially restricted. The controller 510 may prevent the external diagnostic apparatus 10 from accessing the target communication node 600 unrestrictedly.

Figure 9:
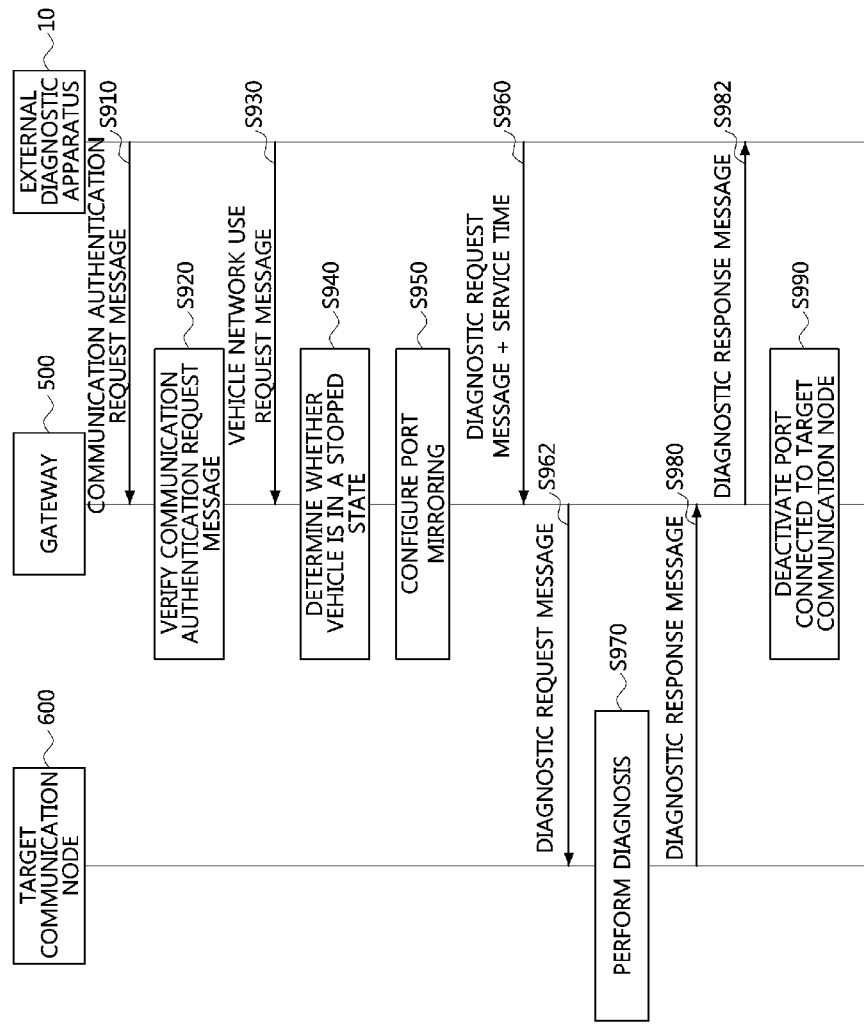
FIG. 9 shows a sequence chart illustrating a second embodiment of a vehicle diagnostic method.

FIG. 9 is a sequence chart illustrating a second embodiment of a vehicle diagnostic method.

The vehicle diagnostic method shown in FIG. 9 may be applied to the remaining sessions except for the basic session. However, the embodiment is not limited thereto. For example, the vehicle diagnostic method shown in FIG. 9 may also be applied to the basic session.

Referring to FIG. 9, in a step S910, the external diagnostic apparatus 10 may transmit a communication authentication request message for communications with the vehicle network. The PHY layer 520 may receive the communication authentication request message via the first port P1. The communication authentication request message may include identification information of the external diagnostic apparatus 10 and information on a diagnostic range of the external diagnostic apparatus 10. The PHY layer 520 may forward the communication authentication request message to the controller 510.

In a step S920, the controller 510 may verify the communication authentication request message. The controller 510 may determine whether or not the diagnostic range of the external diagnostic apparatus 10 belongs to an acceptable security range. If the controller 510 determines that the diagnostic range of the external diagnostic apparatus 10 is not allowed, the diagnostic process may be terminated.

In a step S930, when the communication authentication for the external diagnostic apparatus 10 is completed, the external diagnostic apparatus 10 may transmit a vehicle network use request message. The PHY layer 520 may receive the vehicle network use request message through the first port P1. The PHY layer 520 may forward the vehicle network use request message to the controller 510.

In a step S940, the controller 510 may determine whether the vehicle is in a stopped state after receiving the vehicle network use request message. The controller 510 may determine whether the vehicle is in a stopped state or not based on a vehicle speed, information on a powertrain of the vehicle, position information of the vehicle, and the like. For example, when the vehicle speed is measured at 0 km per hour, the controller 510 may determine that the vehicle is in the stopped state. The controller 510 may determine that the vehicle is in the stopped state when a gear of the vehicle is parked. The controller 510 may determine that the vehicle is in the stopped state if the position of the vehicle identified from a global positioning system (GPS) does not change.

In a step S950, the controller 510 may configure the PHY layer so that the PHY layer performs port mirroring when it determines that the vehicle is in the stopped state. The controller 510 may cause a message received from the external diagnostic apparatus 10 to be mirrored to the target communication node 600. The controller 510 may receive a diagnostic request message and configure the PHY layer 520 such that the message received from the first port P1 is mirrored to the second port P2. The controller 510 may configure a destination of the message received from the first port P1 to the second port P2.

The controller 510 may establish mirroring from the external diagnostic apparatus 10 to the Ethernet based communication nodes connected to the gateway 500. The controller 510 may restrict the mirroring from the Ethernet based communication nodes connected to the gateway 500 to the external diagnostic apparatus 10. Accordingly, the message transmitted by the target communication node 600 may not be mirrored.

The PHY layer 520 may transmit the message received through the first port P1 to the target communication node 600 via the second port P2 by the mirroring operation without transmitting the message to the controller 510.

The case where the destination port of the port mirroring is set as the second port P2 has been described, but the embodiment is not limited thereto. For example, when there are a plurality of target communication nodes, a message received through the first port P1 may be mirrored so as to be transmitted through a plurality of ports.

In step a S960, the external diagnostic apparatus 10 may transmit a diagnosis request message. The external diagnostic apparatus 10 may transmit the service time information together. The PHY layer 520 may transmit the service time information to the controller 510.

In a step S962, the PHY layer 520 may transmit the diagnostic request message to the target communication node 600 through the second port P2 by mirroring. The PHY layer 520 may transmit the diagnostic request message to a plurality of communication nodes through a plurality of ports.

In a step S970, the target communication node 600 may perform a diagnostic function. The target communication node 600 may extract diagnostic information of a diagnosis requested by the external diagnostic apparatus 10. The target communication node 600 may generate a diagnostic response message based on the diagnostic information.

In a step S980, the target communication node 600 may transmit the diagnostic response message. The gateway 500 may receive the diagnostic response message via the second port P2. The controller 510 may configure the PHY layer 520 such that the diagnostic response message received through the second port P2 is forwarded through the first port P1.

In a step S982, the PHY layer 520 may forward the diagnostic response message to the external diagnostic apparatus 10 via the first port P1.

In a step S990, when the service time is ended, the controller 510 may deactivate the second port P2 connected to the target communication node 600 by changing the configuration of the PHY layer 520. As another example, the controller 510 may configure the PHY layer 520 such that the second to fifth ports P2, P3, P4, and P5 are deactivated. The controller 510 may configure the PHY layer 520 such that the first to fifth ports P1, P2, P3, P4, and P5 are deactivated.

According to the operation of the controller 510 and the PHY layer 520, the port mirroring and message forwarding may be interrupted when the service time expires. Message exchanges between the external diagnostic apparatus 10 and the target communication node 600 may be restricted.

Figure 10:
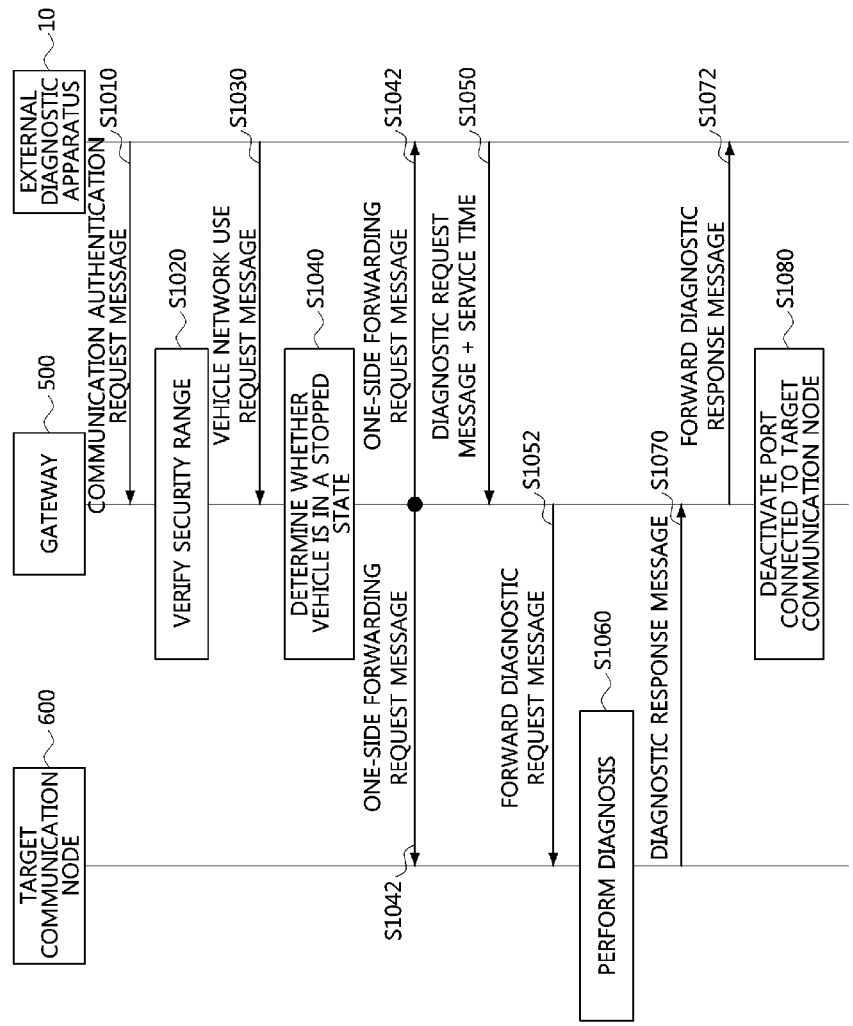
FIG. 10 shows a sequence chart illustrating a third embodiment of a vehicle diagnostic method.

FIG. 10 shows a sequence chart illustrating a third embodiment of a vehicle diagnostic method.

In the following description of an embodiment of FIG. 10, the description redundant with that of FIG. 9 is omitted. The vehicle diagnostic method shown in FIG. 10 may be applied to the remaining sessions except for the basic session. However, the embodiment is not limited thereto. For example, the vehicle diagnostic method shown in FIG. 10 may be applied to the basic session.

Referring to FIG. 10, in a step S1040, the controller 510 may determine whether the vehicle is in a stopped state.

In a step S1042, if the vehicle is not in a stopped state, the controller 510 may transmit a one-side forwarding request message through the PHY layer 520. The target communication node 600 and the external diagnostic apparatus 10 may receive the one-side forwarding request message. The target communication node 600 and the external diagnostic apparatus 10 may make a unicast address be included in a message generated after receiving the one-side forwarding request message. The target communication node 600 and the external diagnostic apparatus 10 may configure a destination of the message as a communication node. Accordingly, the message transmitted by the external diagnostic apparatus 10 may be delivered to the target communication node 600. The unicast address may include information that identifies the port to which the communication node, the destination of the message, is connected.

In a step S1050, the external diagnostic apparatus 10 may transmit a diagnostic request message and service time information. The diagnostic request message may include a unicast address indicating the target communication node 600. The PHY layer 520 may receive the diagnostic request message and service time information. The PHY layer 520 may forward the diagnostic request message and the service time information to the controller 510. The controller 510 may determine a port ID of the second port P2 to which the target communication node 600, which is the destination of the message, is connected from the unicast address included in the diagnostic request message.

For example, the unicast address may include an index key that identifies the destination of the message. The controller 510 may determine the communication node that matches the index key and determine an ID of a port to which the message is to be forwarded. The controller 510 may determine the port ID of the port to which the diagnostic request message is to be transmitted from the unicast address included in the diagnostic request message.

In a step S1052, the PHY layer 520 may forward the diagnostic request message through the second port P2 under the control of the controller 510.

In a step S1060, the target communication node 600 may perform a diagnostic function. The target communication node 600 may extract diagnostic information on a diagnosis requested by the external diagnostic apparatus 10. The target communication node 600 may generate a diagnostic response message based on the diagnostic information.

In a step S1070, the target communication node 600 may transmit a diagnostic response message. The diagnostic response message may include a unicast address indicating the external diagnostic apparatus 10. The unicast address may include an index key that identifies the external diagnostic apparatus 10. The controller 510 may determine a port ID of the port to which the diagnostic response message is to be transmitted from the index key.

In a step S1072, the PHY layer 520 may forward the diagnostic response message through the first port P1 under the control of the controller 510.

In a step S1080, when the service time expires, the controller 510 may deactivate the second port P2 connected to the target communication node 600 by changing the configuration of the PHY layer 520. As another example, the controller 510 may configure the PHY layer 520 such that the second to fifth ports P2, P3, P4, and P5 are deactivated. The controller 510 may configure the PHY layer 520 such that the first to fifth ports P1, P2, P3, P4, and P5 are deactivated.

According to the operation of the controller 510 and the PHY layer 520, when the service time ends, the one-side forwarding may be stopped. Message exchanges between the external diagnostic apparatus 10 and the target communication node 600 may be restricted.

Hereinabove, the diagnostic method of the gateway and the gateway according to the embodiments of the present disclosure have been described with reference to FIGS. 1 to 10. According to the embodiments described above, message exchanges between the external diagnostic apparatus and the target communication node may be performed by the gateway managing the connection states of the ports while the external diagnosis apparatus performs the diagnosis on the vehicle network. Thorough the port mirroring, the forwarding method, etc., the messages can be selectively transmitted to the target communication node or the external diagnostic apparatus during the diagnosis process. Also, considering security range and service time, the gateway can enhance security in the diagnostic procedure by activating or deactivating the connections of the ports.

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. A diagnostic method performed by a gateway in a vehicle network, wherein the gateway comprises a controller and a physical (PHY) layer which manages ports and is connected to the controller, the diagnostic method comprising:
   receiving, by the PHY layer, a diagnostic request message from an external diagnostic apparatus connected to a first port;
   receiving, by the controller, the diagnostic request message from the PHY layer when a security authentication is required for the diagnostic request message,
   receiving, by the controller, a security authentication request message and information on a service time during which a diagnostic service is performed from the external diagnostic apparatus;
   verifying, by the controller, the security authentication request message;
   activating, by the PHY layer, a port of the PHY layer connected to a target communication node to be diagnosed among the ports, under control of the controller in the service time, when verification of the security authentication request message is completed; and
   deactivating, by the PHY layer, the port connected to the target communication node under control of the controller when the service time expires,
   wherein a message exchange between the external diagnostic apparatus and the target communication node is restricted by the deactivation of the port connected to the target communication node.

2. The diagnostic method according to claim 1, wherein the PHY layer transfers the diagnostic request message to the target communication node without transferring the diagnostic request message to the controller, when the security authentication is not required for the diagnostic request message.

3. The diagnostic method according to claim 1, wherein the controller terminates a diagnostic procedure and does not allow communications between the external diagnostic apparatus and an in-vehicle communication node when the verification of the security authentication request message fails.

4. The diagnostic method according to claim 1, further comprising determining, by the controller, at least one of a medium access control (MAC) address and an Internet protocol (IP) address of the target communication node based on a name or information on a function of the target communication node to be diagnosed,
   wherein the diagnostic request message includes the name or information on the function of the target communication node.

5. The diagnostic method according to claim 1, further comprising transmitting, by the controller, security authentication information for the external diagnostic apparatus to the target communication node when the verification of the security authentication request message is completed.

6. The diagnostic method according to claim 1, further comprising:
   receiving, by the PHY layer, a diagnostic response message from the target communication node; and
   transferring, by the PHY layer, the diagnostic response message to the external diagnostic apparatus in a port forwarding manner under control of the controller.

7. The diagnostic method according to claim 1, wherein the vehicle network comprises an Ethernet-based vehicle network and a controller area network (CAN) based vehicle network, and the target communication node belongs to the Ethernet-based vehicle network.

8. A gateway in a vehicle network, the gateway comprising a controller and a physical (PHY) layer which is connected to the controller and manages connection states of ports,
   wherein the PHY layer receives an authentication request message from an external diagnostic apparatus connected to a first port,
   wherein the controller receives a diagnostic request message from the PHY layer when a security authentication on the authentication request message is required, receives a security authentication request message and information on a service time during which a diagnostic service is performed from the external diagnostic apparatus, and verifies the security authentication request message,
   wherein the PHY layer activates a port connected to a target communication node to be diagnosed among the ports under a control of the controller in the service time when verification of the security authentication request message is completed, and deactivates the port connected to the target communication node under control of the controller when the service time expires, and wherein a message exchange between the external diagnostic apparatus and the target communication node is restricted by the deactivation of the port connected to the target communication node.

9. The gateway according to claim 8, wherein the PHY layer transfers the diagnostic request message to the target communication node without transferring the diagnostic request message to the controller, when the security authentication is not required for the diagnostic request message.

10. The gateway according to claim 8, wherein the diagnostic request message includes a name or information on a function of the target communication node to be diagnosed, and the controller determines at least one of a medium access control (MAC) address and an Internet protocol (IP) address of the target communication node based on the name or information on the function of the target communication node.

* * * * *